Figure 2:
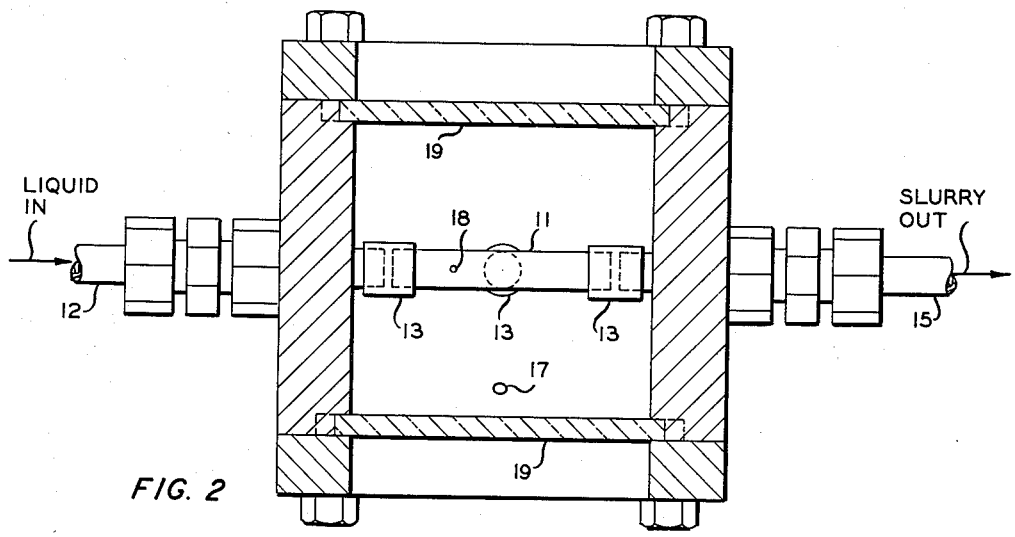

April 9, 1963 J. S. MARTINEZ ET AL 3,084,915
TRANSPARENT FLUID-SOLID MIXING DEVICE
Filed Jan. 15, 1960

INVENTORS
J. S. MARTINEZ
V. E. GAEDE
BY
Hudson & Young
ATTORNEYS

United States Patent Office 3,084,915
Patented Apr. 9, 1963

3,084,915
TRANSPARENT FLUID-SOLID MIXING DEVICE
Jesus S. Martinez and Virgil E. Gaede, Pasadena, Tex., assignors to Phillips Petroleum Company, a corporation of Delaware
Filed Jan. 15, 1960, Ser. No. 2,754
5 Claims. (Cl. 259—4)

This invention relates to a device for observing and controlling the mixing of a solid with a fluid at elevated pressure to form a solids-in-fluid suspension. In accordance with one aspect, this invention relates to a novel apparatus adapted to permit visual observation of the mixing of finely divided or pulverulent solid with a fluid at elevated pressure to form a solids-in-fluid suspension which is subsequently passed to a place of utilization. In accordance with another aspect, this invention relates to a novel apparatus adapted to permit visual observation and control of the mixing of a finely divided or pulverulent catalyst with a liquid solvent at elevated pressure to form a solids-in-liquid suspension which is then passed to a reaction zone.

In the fluid mixing of solids, as well as the fluid transportation of solids, it is often desirable, and in many cases necessary, to provide means for visually observing the mixing operation or flow of solids-in-fluid suspension formed. In many plant operations, the mixing of a solid with a fluid is accomplished at relatively low pressures, often at atmospheric conditions, and, therefore, a transparent section in a conduit or fitting is adequate to observe the flow of material. However, in high pressure mixing or flow systems such an expedient is not satisfactory in conduits since the transparent section would not withstand the pressures employed. The present invention is directed to an apparatus that is adapted particularly for permitting visual observation and control of high pressure mixing of a solid with a fluid, especially a liquid.

Accordingly, it is an object of this invention to provide a novel apparatus for controlling the mixing of a solid with a fluid.

It is another object of this invention to provide a convenient apparatus adapted for the visual observation and control of high pressure mixing of solids with fluids.

A further object of this invention is to provide a safe apparatus for the visual observation and control of mixing of a solid with a liquid at high pressure and transportation of the solids-in-liquid suspension formed.

Other aspects, objects, as well as the several advantages of the present invention will become apparent upon a study of the disclosure, drawing and the appended claims.

In accordance with the present invention, we provide a transparent or translucent mixing T for mixing a solid with a fluid, particularly a liquid, prior to utilization to give visual observation for better control purposes. Broadly, the device of the present invention comprises a transparent T, for example, glass, having a liquid entering one end, a finely divided solid entering the T's side opening, and a solid suspension removed from the other end of the T. The transparent T is contained within a fluid-tight housing, for example, a commercial bullseye, having at least one transparent wall or window to permit visual observation of the interior thereof. The fluid pressure inside and outside of the transparent T is equalized by providing a small port on the fluid inlet end of the transparent T to fill the space within the housing surrounding the T with fluid at the same pressure as within the T.

The device of the present invention can be utilized in any system wherein it is desired to observe and control responsive thereto the mixing of a fluid with a finely divided solid at an elevated pressure to form a solids suspension. The device of the present invention can be used in mixing operations carried out at pressures ranging from atmospheric to as high as 1000 p.s.i.g., or more, depending upon the strength of the materials employed in the device. In one device that we have used a fluid pressure of about 500 p.s.i.g. was employed.

The fluid to be mixed with the solid in our device can be either a gas or liquid. The solids stream introduced into the transparent T can be admixed with a liquid or a gas. Preferably, our mixing device is employed where it is desired to dilute a liquid-solid phase of high solids content with the same or a different liquid.

Figure 1:
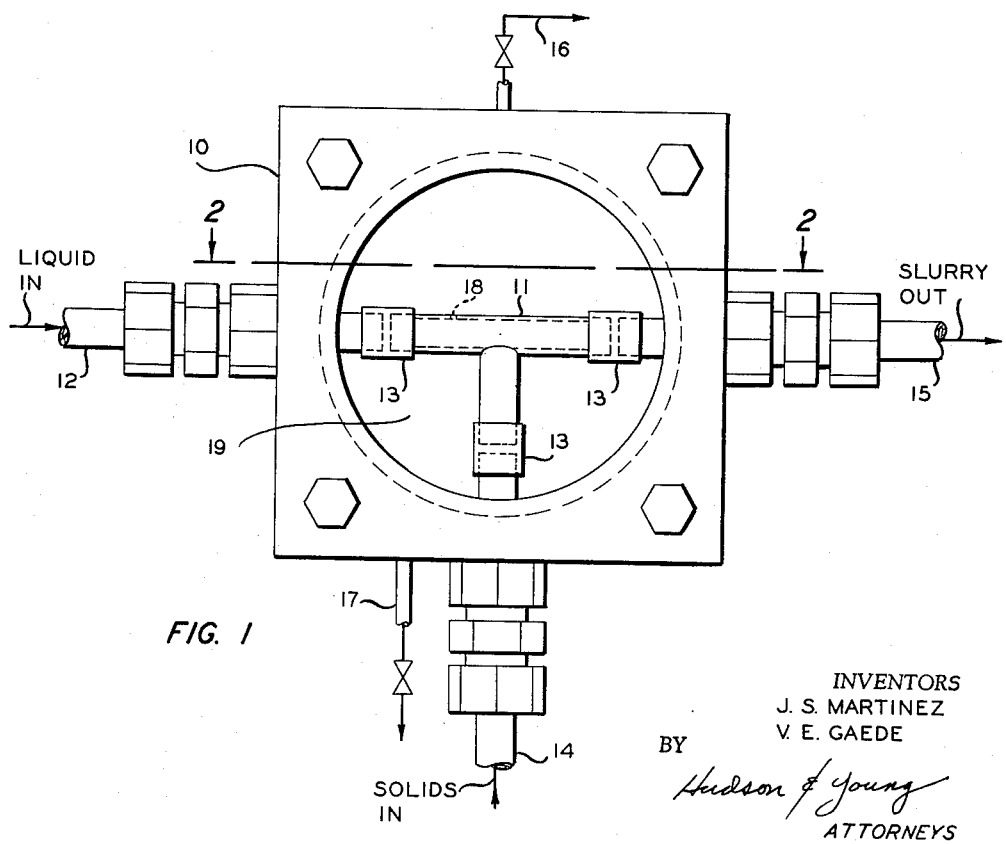

A better understanding of our invention will be obtained upon reference to the accompanying drawings of a transparent mixing device constructed in accordance with the invention, wherein FIGURE 1 is a side elevation and FIGURE 2 is a sectional plan taken along line 2—2 of FIGURE 1.

Referring now particularly to the drawings, reference numeral 10 refers generally to a fluid-tight housing having at least one transparent wall to permit observation of the interior of the housing. The housing can be a commercial bullseye, or other suitable type of sight glass, which is constructed in such a manner as to withstand elevated pressures within the housing. Housing 10 shown in the drawing is box-shaped and has two transparent walls disposed at opposite sides of the housing. However, if desired, the housing can assume other shapes so long as there is provided means to observe the interior and the device can withstand elevated pressures.

Centrally disposed within housing 10 is a glass T 11. T 11 can be constructed of other transparent or translucent materials if desired. A pipe or conduit 12 enters one end of housing 10 and is connected to one end of T 11. Pipe 12 is metal and a suitable connector 13 for connecting metal to glass is provided. Liquid or gas under elevated pressure is introduced into transparent mixing T 11 by way of conduit 12. A pipe 14 for conveying solids enters a side of housing 10 and is connected through connector 13 to the side opening of transparent T 11. The solids introduced by conduit 14 are mixed with liquid introduced by way of conduit 12 in mixing T 11. Preferably, the pressure of the fluid introduced by conduit 12 is slightly higher than the pressure of solids introduced in conduit 14 so as to draw solids more readily into T 11.

The solids suspension formed in mixing T 11 is removed by way of conduit 15 connected to one end of T 11 by connector 13. Positioned on top of housing 10 is a vent 16 which is used to bleed off gas upon start-up of the unit. Positioned at the bottom of housing 10 is a drain 17 which is used to remove accumulated solids within housing 10. An equalizing port 18 is provided on top of glass T 11 on the liquid inlet end to permit maintenance of equal pressure inside and outside of the transparent T 11. If desired, the equalizing port can be located downstream of the point of mixing of solids with liquid, but in such a case solids would accumulate within the housing and may not be desirable in many operations.

In the embodiment shown, it is obvious that direct observation of the mixing taking place within transparent T 11 can be had through the transparent windows 19 in housing 10. If desired, a light source (not shown) can be positioned adjacent to one of the windows to illuminate the interior of the housing to facilitate observation. Further, if desired, an automatic device can be provided for detecting stoppage in the flow of the suspension within glass T 11 and sound an alarm or other warning device.

The invention has been found to be particularly useful in providing a means for visually observing the mixing of a finely divided catalyst with a liquid to provide a catalyst slurry suitable for passage to a reaction zone. In one particular application in which the invention has been used, the catalyst slurry formed in the apparatus of the claimed invention was fed into a polymerization reactor wherein a 1-olefin was converted into a polyolefin. The finely divided catalyst introduced into the mixing device of the invention was mixed with a liquid hydrocarbon solvent such as cyclohexane in glass T 11. By utilizing the transparent T of the present invention, considerable savings resulted from reduced reactor upsets and shutdowns due to catalyst flow interruptions. Other advantages of the invention include observation at all times of the flow of catalyst to the reactor, easy detection and action taken to determine cause of interruptions of catalyst flow and additionally a rough estimate of catalyst charge rate can be obtained.

As indicated above, the device of the present invention can be used in any desired mixing operation. Use of the mixing device of the present invention in other operations is limited only by the pressure rating of the housing and abrasion resistance of the transparent T.

From the foregoing description taken in connection with the drawing, it is believed that the construction, operation and advantages of our invention will be readily understood without requiring a more extended explanation.

We claim:

1. An apparatus for visually observing the mixing of a solid with a fluid in a conduit at elevated pressure comprising, in combination, a fluid-tight housing having at least one transparent wall to permit observation of the interior thereof, a transparent conduit T disposed within said housing, means for introducing said fluid into a first opening of said T, means for introducing said solid into a second opening of said T, means for removing a fluid suspension of said solid from a third opening of said T and said housing, and equalizing means to maintain equal fluid pressure inside and outside of said T within said housing.

2. Apparatus according to claim 1 wherein said T is glass and said equalizing means comprises port means in said T upstream of the point of entry of said solid in said T.

3. An apparatus for visually observing the mixing of a fluid with a finely divided solid in a conduit at high pressure comprising, in combination, a fluid-tight box-shaped housing having at least one transparent wall to permit observation of the interior thereof, means to vent and drain said housing, a transparent T disposed within said housing, means for introducing said fluid into one end of said T, means for introducing said solid into the side opening of said T, means for removing a fluid suspension of said solids from the other end of said T and said housing, and port means in said T to maintain equal fluid pressure inside and outside of said T within said housing.

4. Apparatus according to claim 3 wherein said housing has two windows disposed at opposite sides of said housing, said T is glass and said port in said T is on said fluid inlet end of said T upstream of the point of mixing.

5. An apparatus for visually observing the mixing of a liquid with a pulverulent solid in a pipe at an elevated pressure comprising, in combination, a liquid tight box-shaped housing adapted to withstand said pressure and having at least one transparent side wall to permit observation of the interior thereof, means to vent and drain said housing, a transparent T disposed within said housing, a first pipe entering one end of said housing and connected to one end of said T to introduce liquid therein, a second pipe entering a side wall of said housing adjacent to said transparent wall and connected to the side inlet of said T to introduce said solid into said T and mix same with said liquid therein to form a liquid suspension of said solid, a third pipe entering the other end of said housing and connected to the other end of said T to remove said suspension from said T, and port means on the liquid inlet end of said T upstream of the point of mixing to equalize the pressure around said T within said housing.

References Cited in the file of this patent

UNITED STATES PATENTS

| | | |
|---|---|---|
| 522,927 | Williams | July 10, 1894 |
| 696,277 | Sponseller et al. | Mar. 25, 1902 |
| 1,566,948 | Wyatt | Dec. 22, 1925 |
| 2,125,913 | Goebels | Aug. 9, 1938 |
| 2,453,465 | Sloan | Nov. 9, 1948 |
| 2,605,185 | Zachariassen et al. | July 29, 1952 |
| 2,681,034 | Mannion | June 15, 1954 |
| 2,707,453 | Boyle | May 3, 1955 |
| 2,739,480 | Le Van et al. | Mar. 27, 1956 |